(12) United States Patent
Hamilton et al.

(10) Patent No.: US 10,268,452 B2
(45) Date of Patent: *Apr. 23, 2019

(54) AUTOMATIC CONTROL SYSTEM AND METHOD FOR A TRUE RANDOM NUMBER GENERATOR

(71) Applicant: Synopsys, Inc., Mountain View, CA (US)

(72) Inventors: Scott Andrew Hamilton, Toronto (CA); Neil Farquhar Hamilton, Kanata (CA)

(73) Assignee: Synopsys, Inc., Mountain View, CA (US)

( * ) Notice: Subject to any disclaimer, the term of this patent is extended or adjusted under 35 U.S.C. 154(b) by 62 days.

This patent is subject to a terminal disclaimer.

(21) Appl. No.: 15/397,490

(22) Filed: Jan. 3, 2017

(65) Prior Publication Data
US 2017/0115959 A1    Apr. 27, 2017

Related U.S. Application Data

(63) Continuation of application No. 14/259,661, filed on Apr. 23, 2014, now Pat. No. 9,542,156.

(60) Provisional application No. 61/823,721, filed on May 15, 2013, provisional application No. 61/823,734, filed on May 15, 2013.

(51) Int. Cl.
  *G06F 7/58*    (2006.01)
(52) U.S. Cl.
  CPC .............. *G06F 7/582* (2013.01); *G06F 7/588* (2013.01)
(58) Field of Classification Search
  None
  See application file for complete search history.

(56) References Cited

U.S. PATENT DOCUMENTS

| | | | |
|---|---|---|---|
| 6,219,789 B1* | 4/2001 | Little | G06F 7/588 726/34 |
| 8,019,802 B2 | 9/2011 | Rose et al. | |
| 8,351,603 B2 | 1/2013 | Oishi et al. | |
| 2002/0172359 A1 | 11/2002 | Saarinen | |
| 2008/0263117 A1 | 10/2008 | Rose et al. | |
| 2017/0115959 A1* | 4/2017 | Hamilton | G06F 7/582 |

FOREIGN PATENT DOCUMENTS

CN    101655780    2/2010

OTHER PUBLICATIONS

Chinese Patent Office, Office Action received from the Chinese Patent Office dated Jun. 12, 2017 for appln. No. 201480028514.6.

* cited by examiner

*Primary Examiner* — David H Malzahn
(74) *Attorney, Agent, or Firm* — Jaquez Land Greenhaus LLP; Bruce W. Greenhaus, Esq.

(57) ABSTRACT

A system for reseeding a pseudo random number generator to generate pseudo random numbers includes a true random number generator generating a true random number, a storage device storing the generated true random number, a pseudo random number generator generating pseudo random numbers using the stored true random number as a seed, and a controller coupled to the true random number generator and the pseudo random number generator to (1) generate a new true random number concurrently with the operation of the pseudo random number generator, and storing the new true random number, and (2) reseed the pseudo random number generator with the new true random number.

14 Claims, 10 Drawing Sheets

AUTOMATIC CONTROL SYSTEM AND METHOD FOR A TRUE RANDOM NUMBER GENERATOR

CROSS REFERENCE TO RELATED APPLICATIONS

This application is a continuation application of U.S. Pat. No. 9,542,156, filed Apr. 23, 2014, entitled "Automatic Control System and Method for a True Random Number Generator", the disclosure of which is incorporated herein by reference in its entirety. U.S. Pat. No. 9,542,156 claims the benefit of U.S. Provisional Application No. 61/823,721, filed May 15, 2013, and U.S. Provisional Application No. 61/823,734, filed May 15, 2013, both of which are hereby incorporated by reference herein in their entirety.

FIELD OF THE INVENTION

The invention generally relates to random number generators, and more specifically the generation of random numbers suitable for use, for example, in cryptographic processes and other protocols implemented in electronic systems.

BACKGROUND OF THE INVENTION

Random number generators (RNGs) attempt to generate a sequence of values that are random as defined mathematically. There are two forms of random number generator. A commonly used random number generator generates a sequence of apparently random values that is in actuality deterministic. Such a random number generator is referred to as a pseudo random number generator (PRNG). A pseudo random number generator relies on a first value, a seed value, in order to determine a sequence based thereon that appears random and has random characteristics. Because the process is mathematical in nature, it is relatively fast and can be implemented very efficiently and predictably in hardware. Unfortunately, pseudo random number generators produce predictable results which affect their usefulness.

Cryptographic quality random number generators (RNGs) implemented in digital logic hardware usually make use of a bank of registers for their control and data interfaces to the system. The natural size of numbers used in cryptographic systems tends to be large: 16 or 32 bytes. The sizes of common computer processor control and data paths used today is usually 1, 2, 4 or 8 bytes. Thus conversions are frequently made to adapt the size of RNG registers to the natural size of the controlling processor. This often uses more register space. While wide buses excel at moving data quickly, they consume large areas on an integrated circuit die or a circuit board.

Further, though the design of a pseudo random number generator (PRNG) is deterministic and easily verified against an algorithm, a true random number generator (TRNG) is not so easily verified. If it were discovered that a TRNG was inadequate, an entire circuit or system often loses its utility. This is very significant in larger systems where many random number generators are needed. In such systems, each PRNG is easily implemented and verified near its associated circuit. However, if TRNGs are needed, this then poses the drawback that if one TRNG is compromised, then the system as a whole may be useless. That the, if adequate backup TRNGs are provided, the area required to accommodate wiring to move wide buses of data around become an even greater concern.

A true random number generator (TRNG) is a circuit for generating a sequence of numbers that is non-deterministic. In order to accomplish this, the TRNG circuit obtains its random data from a physical noise source. Unfortunately, physical noise sources present many drawbacks. Amongst these are steady state issues when the physical noise source is external to the circuit, spacing between sampling events to ensure random characteristics, and manufacturing variations. For example, if temperature of a resistor is used as a noise source, placing the circuit in a very hot or cold environment can result in a sequence of values that tends toward one value or another. Similarly, if temperature of a resistor is relied upon, there is a time between value reading that must be observed or the values will be correlated one to another as the thermal noise signal will not have had sufficient time to vary in a random fashion. This is due to the fact that the frequency spectrum of a physical noise process is typically band-limited or inherently low-pass in nature. Also similarly, if during manufacture a small variation results in a resistor that is always a little bit hotter or colder, then the sequence of values may tend toward a known result. Problematically, these issues sometimes do not turn up until after a circuit is manufactured.

A random number generator (RNG) used in a cryptographic system often comprises a cascade of RNGs starting from a non-deterministic random number generator, also called a true random number generator (TRNG), that obtains its random data from a physical noise source. This data, referred to as a seed, is then used as input data to a deterministic random number generator in the form of a pseudorandom number generator (PRNG), which provides a more suitable interface for processor-based systems that make use of the RNG components. Thus, a seed value is determined in accordance with a TRNG process which is often slow. The PRNG which has rapid and predictable performance characteristics then provides a changing sequence of values for use in the encryption process. It is common for the PRNG to use a seed from a TRNG for a period of time, or to produce a certain number of output values within a random sequence of output values. Once the new seed is available, the PRNG is reseeded with a new input value from the TRNG. Once again, the performance and predictability of the PRNG is available.

TRNGs produce results when commanded to do so by a controlling process. The statistical nature of a TRNG's physical input data and the length of a seed value make the time required to produce new seed values long and variable.

It would be advantageous to provide a TRNG that overcomes some of the drawbacks of the prior art.

SUMMARY OF THE INVENTION

In accordance with one embodiment, a system is provided for reseeding a pseudo random number generator to generate pseudo random numbers. The system includes a true random number generator generating a true random number, a storage device storing the generated true random number, a pseudo random number generator generating pseudo random numbers using the stored true random number as a seed, and a controller coupled to the true random number generator and the pseudo random number generator to (1) generate a new true random number concurrently with the operation of the pseudo random number generator, and storing the new true random number, and (2) reseed the pseudo random number generator with the new true random number.

Another embodiment provides a method of re-seeding a pseudo random number generator for generating pseudo random numbers. The method generates a true random number from a true random number generator, stores the generated true random number, generates pseudo random numbers from the pseudo random number generator using the stored true random number as a seed, generates a new true random number concurrently with the operation of the pseudo random number generator, storing the new true random number, and reseeds the pseudo random number generator with the new true random number.

In specific implementations, the generated true random number is stored in an input register in the pseudo random number generator in response to a preselected condition. The reseeding may be effected in response to a preselected condition, such as in response to a predetermined reseed timeout or in response to the counting of a predetermined number of pseudo random numbers generated, or a manual operation. The new true random number may be generated automatically each time a stored true random number is used by the pseudo random number generator as a seed. The generation of pseudo random numbers by the pseudo random number generator may be automatically interrupted for reseeding.

BRIEF DESCRIPTION OF THE DRAWINGS

Exemplary embodiments of the invention will now be described in conjunction with the following drawings, in which.

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
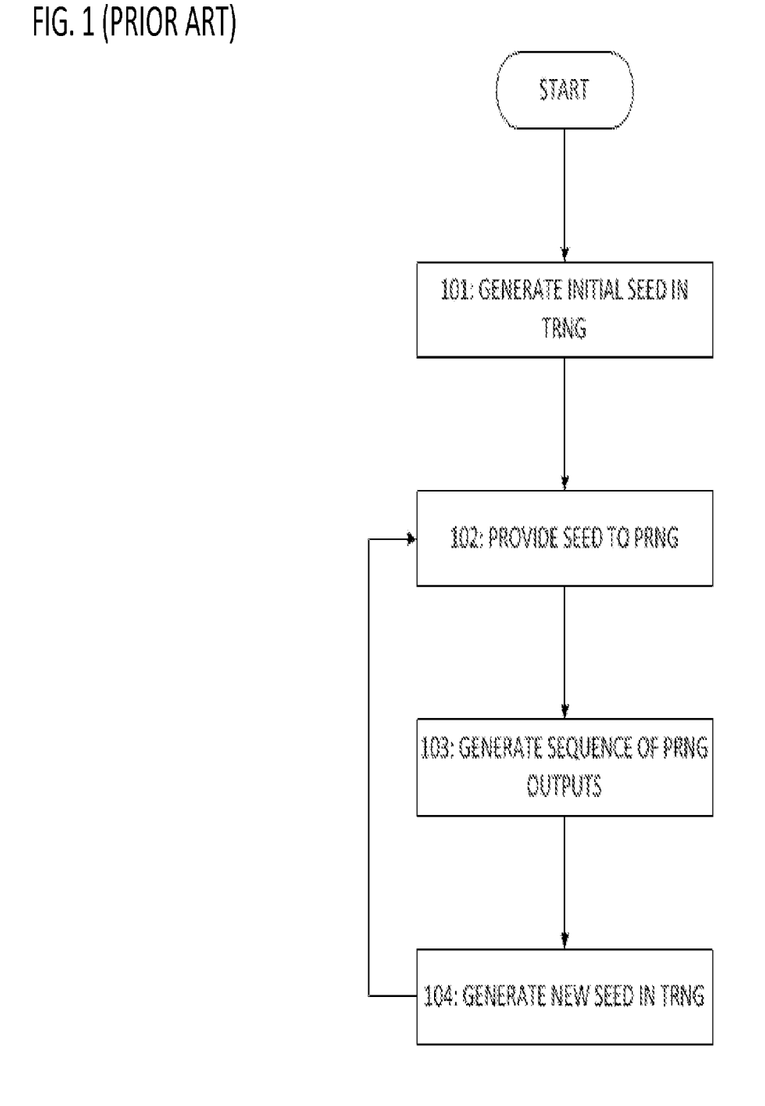
FIG. 1 is a simplified flow diagram of a prior art method of pseudorandom number generation.

Referring to FIG. 1, shown is a simplified process for operating an RNG for a cryptographic system according to the prior art. In step 101, a value within a random sequence of values is generated in a TRNG and in step 102 the value is provided to a PRNG as a seed value. Based on the seed value, in step 103 the PRNG generates a sequence of values within a pseudo random sequence and having random characteristics. After a known time or a known number of operations, a control system—typically software—requests a new seed from the TRNG, generates a new seed in the TRNG, and provides the new seed to the PRNG. The PRNG is then started for generating a new sequence based on the new seed. The same process is repeated in accordance with design requirements.

Figure 2:
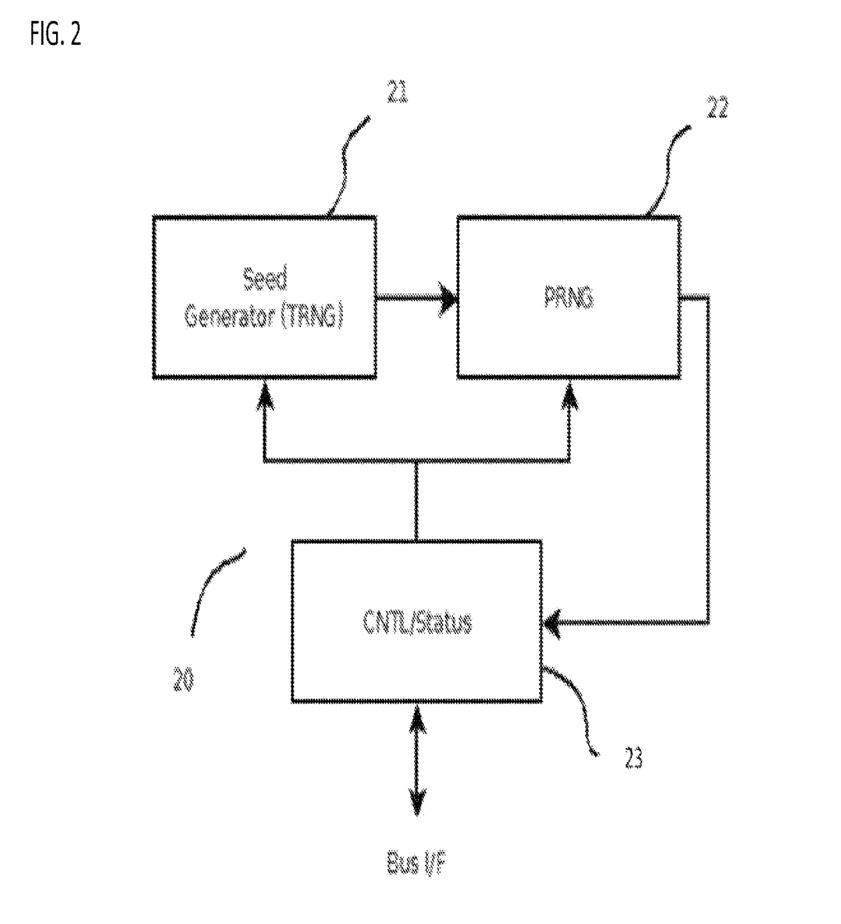
FIG. 2 illustrates a simplified block diagram of a system according to an embodiment of the invention.

Referring to FIG. 2, a simplified block diagram of a system according to an embodiment of RNG 20 is shown. A seed generator 21 in the form of a TRNG is provided. The seed generator 21 provides a seed value to a pseudo random number generator 22. The pseudo random number generator 22 provides a sequence of values in accordance with a deterministic process and based on random seed values received from the seed generator 21. A control/status circuit 23 controls the TRNG 21 and PRNG 22 to automatically reseed the PRNG 22 upon certain events. Optionally, the control/status circuit also supports manual control over reseeding and TRNG 21 and PRNG 22 operations.

For example, a TRNG is formed comprising a set of oscillators connected pairwise to digitizing subsystems. The oscillators' operation is designed to be enabled or disabled by a gating signal. When enabled, each oscillator operates on its fundamental frequency. Oscillator pairs and the digitizing subsystem are designed to optimize a probability of sampling the input signal while it is in its transition region of operation, and therefore its value is neither logic "1" nor "0." Operation of the circuit varies over time due to variations in parameters such as ambient temperature, presence or absence of power supply noise, changes in operating voltage, and other factors. Accordingly, a control circuit monitors operation of the system and adjusts a length of an oscillator chain, and hence its frequency, if it is not producing sufficiently frequent results with sufficient entropy.

In an embodiment, control/status circuit 23 is programmable to reseed the PRNG upon expiration of a predetermined time, upon a predetermined number of values already having been generated within the sequence of pseudo random values, and upon a manual request to update a seed value. The form of such a condition is programmable as is the condition itself. Optionally, the condition is randomly or pseudo randomly assigned. With the programmability, it is possible to select from supported conditions and manual operation in order to result in a circuit that is dynamically configurable for use in different designs and configurations to support testing and other operating modes.

In such an embodiment, the control status circuit 23 for the TRNG 21 includes an auto-reseed subsystem that causes the TRNG output value to be loaded to input registers of the PRNG 22 automatically upon a condition being satisfied. The control status circuit 23 is optionally configured at build time to autonomously execute the seed operation of the TRNG 21 when sufficient time has elapsed since the last seed operation, if a preset threshold of PRNG output values has been read, or upon manual request. Reseeding is performed completely autonomously and in some embodiments does not disrupt the process of random number sequence generation. Optionally, a status register (not shown) provides an indication of which auto-reseed aging mechanism was last triggered.

Figure 3:
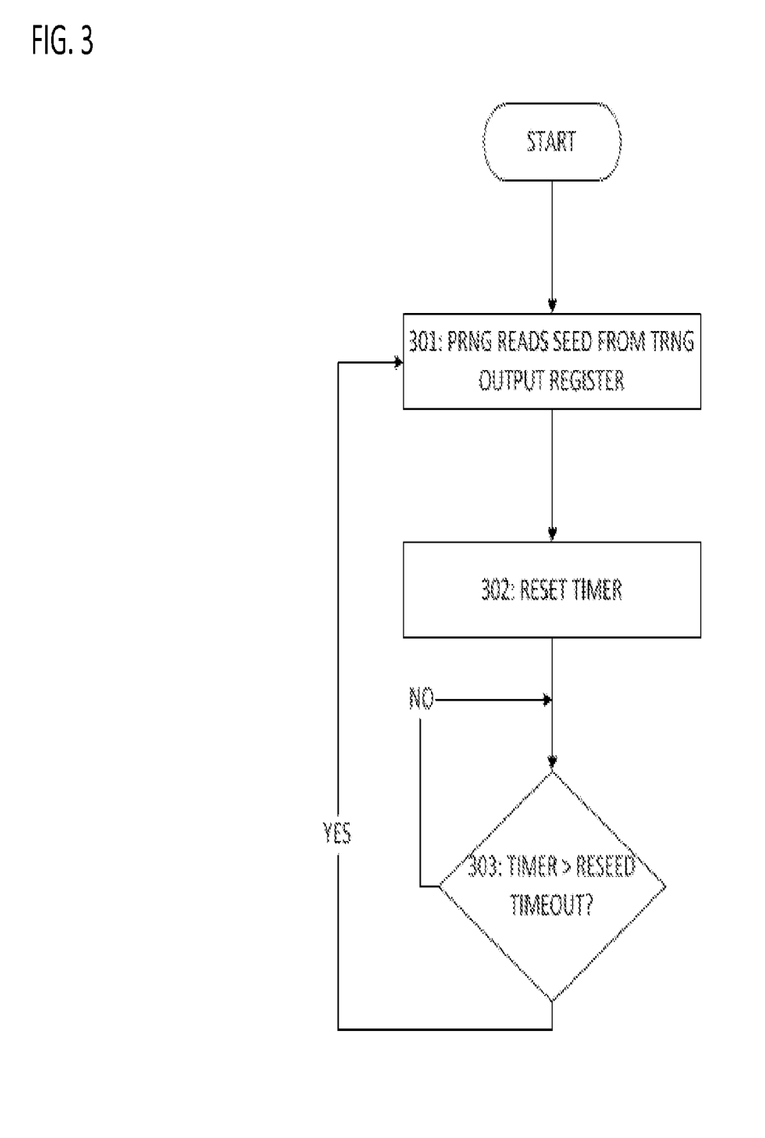
FIG. 3 is a simplified flow diagram of a method of auto reseeding a PRNG based on a predetermined reseed timeout.
Figure 4:
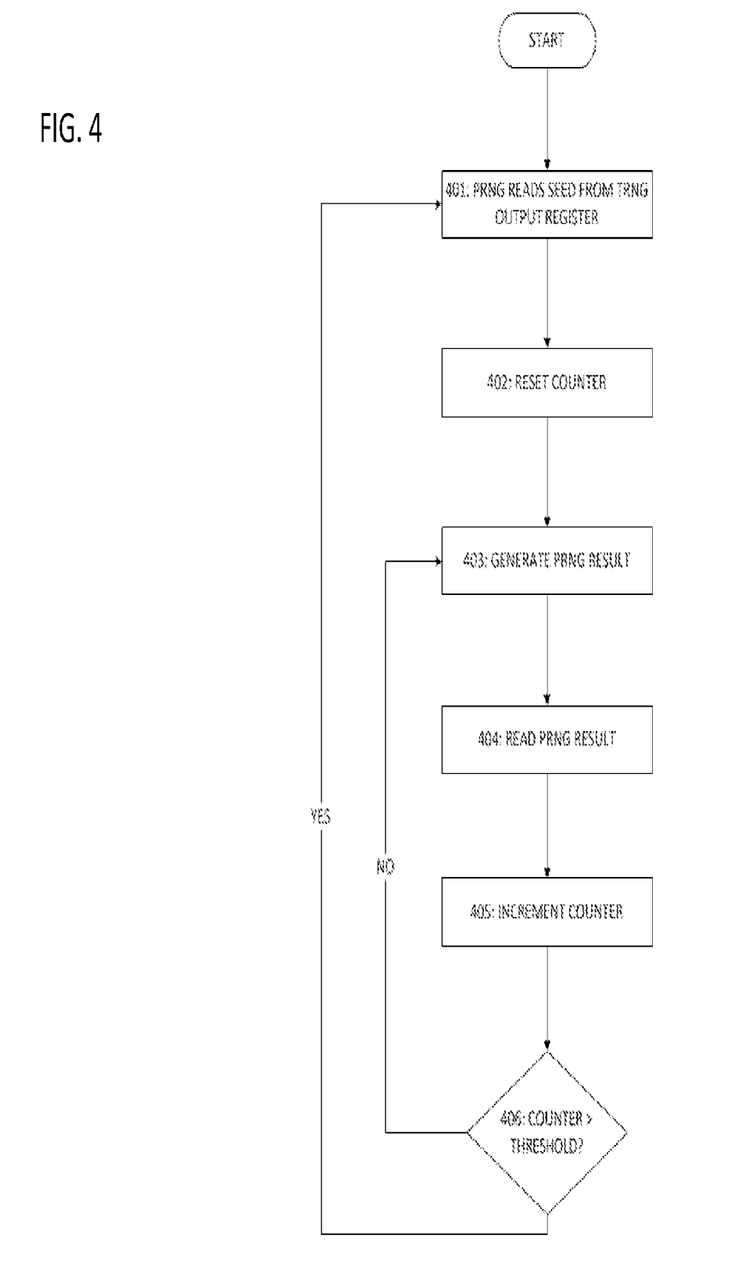
FIG. 4 is a simplified flow diagram of a method of auto reseeding a PRNG based on a predetermined number of values being generated.

Examples are shown in FIG. 3 and FIG. 4. FIG. 3 shows an example of reseeding the PRNG upon expiration of a predetermined reseed timeout. In step 301 the PRNG reads a seed from the TRNG output register. In step 302, a timer is reset. In step 303, the timer is checked to see whether it exceeds the reseed timeout. If yes, then the process returns to step 301. If no, then the timer is continually checked to see whether it exceeds the reseed timeout.

FIG. 4 shows an example of reseeding the PRNG when a predetermined number of values has been generated. In step 401 the PRNG reads a seed from the TRNG output register. In step 402, a counter is reset. In step 403, using the seed, a PRNG result is generated, and in step 404 the result is read. In step 405 the counter is incremented. In step 406, the counter is checked. If the counter exceeds the predetermined number of values, then the process returns to step 401. If not, then the process returns to step 403.

In many cases, the RNG 20 is controlled by a host processor (not shown). The host processor, for example, sets the control/status circuit 23 configuration values that affect the auto-reseed aging subsystem. In some cases, the TRNG 21 is not directly controlled by a host processor, either because a simplified serial interface is used to control the TRNG 21 or because there is no host processor, but only a fixed purpose cryptographic subsystem composed of fixed hardware logic. In these cases, the control/status circuit 23 configuration values may be hard-coded in the logic created when the integrated circuit containing the TRNG 21 is designed.

A first auto-reseeding process tracks the number of clock cycles since the last seeding event—either an automatic reseed or one explicitly requested by the host, when present. When this age count exceeds a host programmed threshold value, an internal reseed command is automatically issued to the TRNG 21.

Another auto-reseeding process counts the number of PRNG output values retrieved by a host or an associated processing circuit and initiates a reseed event when this number exceeds a threshold value.

As is notable, the number of values retrieved from the PRNG is sometimes relatively small for each seed value—$2^4$. Removing overhead to manage the auto reseeding process is advantageous. Further, there are times when a cryptographic engine is not processor controlled where the auto-reseeding process described herein obviates a need for a host processor controlled reseeding operation.

When the TRNG 21 is triggered to generate a new seed, that actual process of generating a complete seed, for example of between 128 and 256 bits, sometimes requires a significant amount of time. Measured in system clock cycles, this process sometimes require greater than 500,000 cycles. It is desirable that the PRNG output values continue to be available even while a new seed value is being generated. Accordingly, in some embodiments the TRNG 21 generates its full output value independent of current operations of the PRNG 22. Only after completing the seed value generation does the TRNG 21 signal the PRNG 22 to load the newly generated seed value into the PRNG. Alternatively, the TRNG 21 generates a new seed value each time a seed value is retrieved and upon receiving the control signal from the control status circuit 23, provides the seed value to the PRNG 22 immediately. Of course, in order to maintain operation of the PRNG 22, seed values cannot be loaded more frequently than they can be generated.

Figure 5:
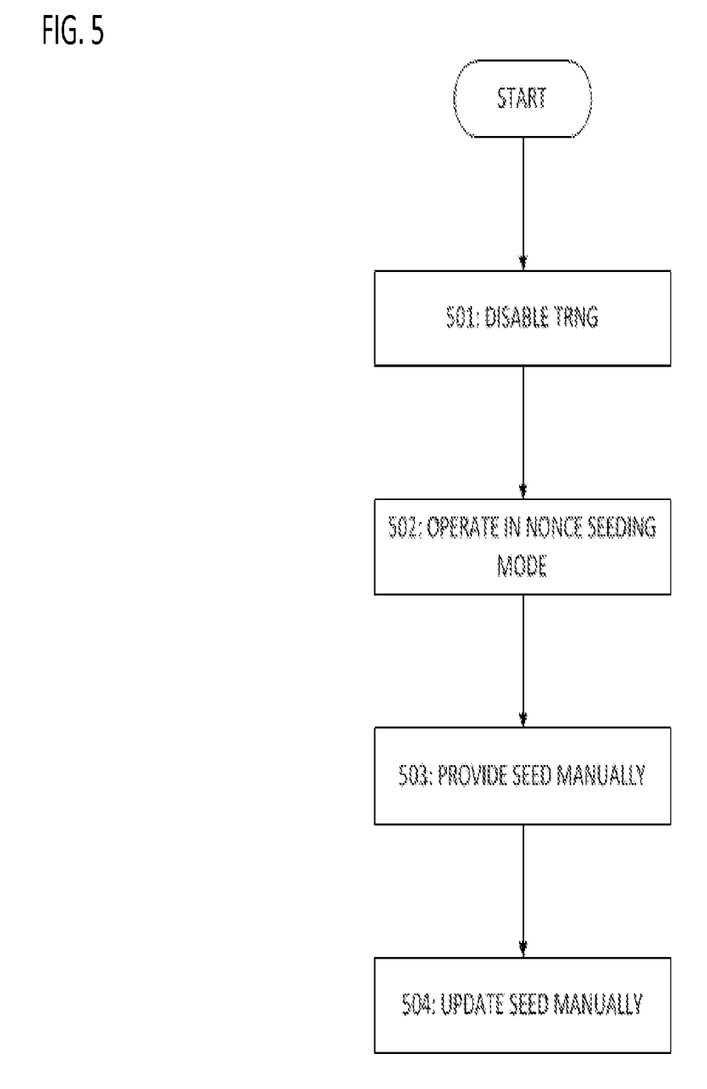
FIG. 5 is a simplified flow diagram of operating the auto reseeding PRNG in nonce-mode.

Referring to FIG. 5, there are occasions when it is desirable to disable the TRNG 21 and operate only the PRNG 22. In FIG. 5, in step 501 the TRNG is disabled. In step 502, the PRNG 22 is seeded using an input parameter called a "nonce", and hence this mode of operation is a called nonce-seeding mode. In nonce-seeding mode, both auto-reseed aging mechanisms are optionally automatically inhibited, regardless of the values in the auto-reseed counter registers. The auto-aging mechanisms remain disabled until the TRNG 21 is re-enabled by host command causing the system to exit nonce-seeding mode. FIG. 5 shows an embodiment where the seed is provided manually (step 503) and updated manually (step 504).

Optionally, the control/status circuit 23 simply provides an indication of when the TRNG 21 should reseed the PRNG 23. In these cases, a build-time parameter allows the TRNG 21 to be configured to generate a status signal indicating that an aging reseed condition has been triggered. The hardware controller, external controller, or software controller then responds to the signal in accordance with a system design.

Advantageously, when manual triggering of reseeding and automatic reseeding are both supported simultaneously, manual reseeding is optionally triggered only sometimes while automatic reseeding addresses the remainder of the reseeding requirements. Further, manual reseeding typically results in resetting of seeding aging status—either count or time. Alternatively, reseeding proceeds as it would have if the manual reseeding had never occurred.

In some embodiments, the condition for automatically triggering a reseeding event is itself automatically updated. For example, values in the random sequence of values from the true random number generator are used to reprogram the conditions such that they vary at intervals. Alternatively, values from the pseudo random number generator are used. Yet further alternatively, values from another random number generator, either a PRNG or a TRNG are used. In yet another alternative embodiment, values from different sources are used to reprogram the conditions under the control of the control/status circuit or under the control of another circuit.

As noted above, the reprogramming period for a seed value can vary over quite a range of read operations or times and, as such, varying these values provides a significant range for varying the seed values. Optionally, the TRNG provides a ready signal to indicate that a seed value is available such that when the condition is met before the seed value is ready, the circuit continues operation pending seed value availability. Alternatively, the TRNG provides a ready signal to indicate that a seed value is available such that when the condition is met before the seed value is ready, the circuit pauses operation pending seed value availability.

The current disclosure is of a control and data interface for RNGs consisting of a minimum of five signals (a "5-wire" interface), with an optional sixth signal to facilitate automatic control of the RNG. The interface may be used when no host register access is available in a system design, or when an auxiliary random serial stream is required. The interface consists of a control and status portion and a data portion.

A typical random number generator provides a register-based control/status and data interface to other system components such as a controlling processor with which it interacts. This supports common processor operations such as move or load register. Thus, typical random number generators are designed to support a register width equivalent to that of the host system or the host system bus. When an 8 bit register is supported by a processor, 32 operations are required to load a 256 bit seed value. With a wider bus, for example 64 bits, the number of operations is reduced but the communication lines and circuitry for the random number generator increases. That the, such an RNG, when implemented in hardware, can couple directly to the data bus or be integrated within a processor chip on the data bus therein. That the, the additional hardware to couple to the data bus is ill suited to some applications. To address these applications, a random number generator is implemented within a dedicated circuit, and directly loads its output value into a register forming part of the dedicated circuit.

For example, when an RNG is part of an entirely hardware based security engine with no controlling processor available, a 256 bit output register can be provided with the random value. The register value can be directly read with hardware for use by the circuit. Unfortunately, such an implementation requires that the random number generator is disposed very close to and dedicated to its associated circuit. Otherwise, the parallel lines from the register to the associated circuit occupy significant space and are therefore quite wasteful.

Figure 6:
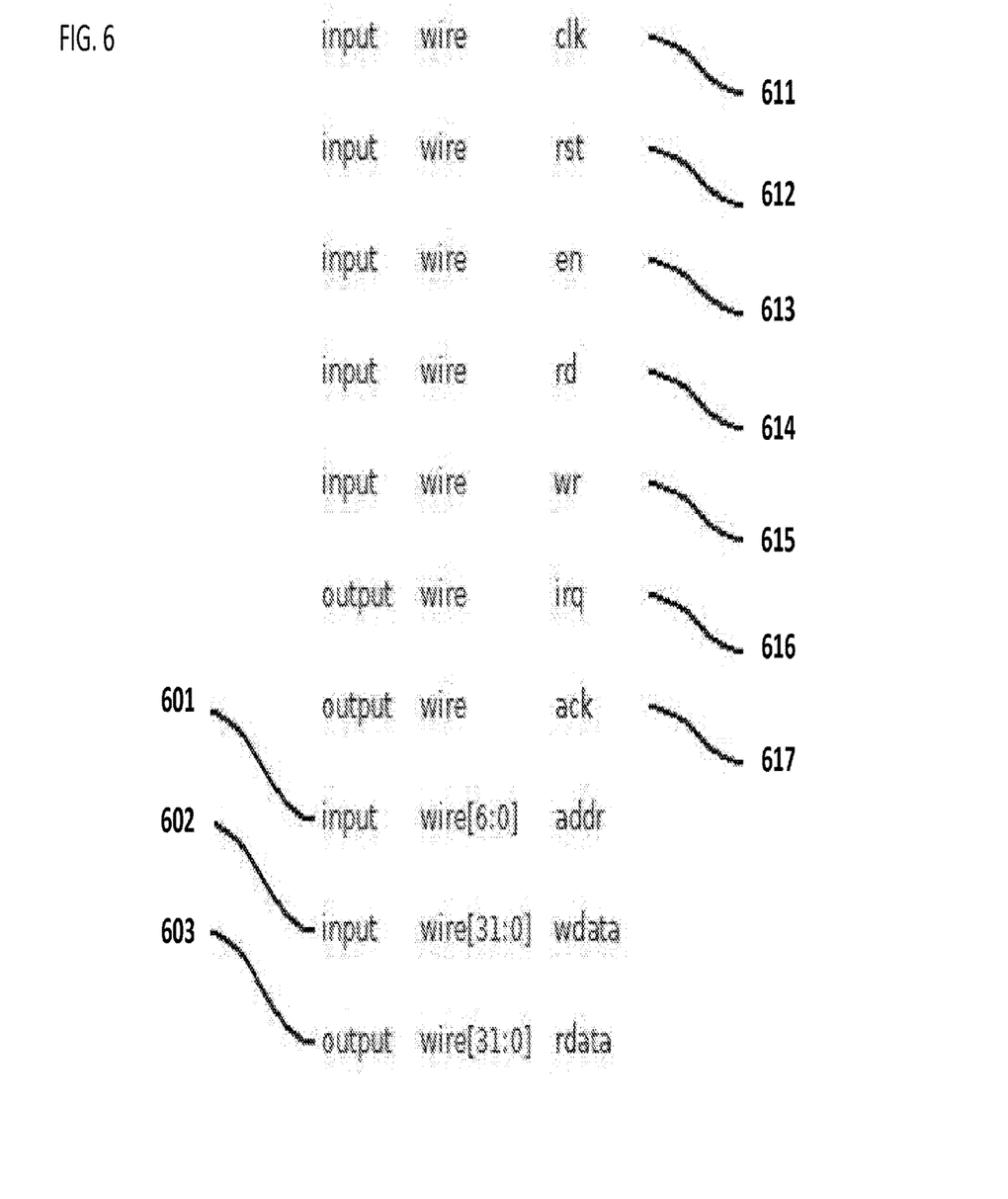
FIG. 6 illustrates a table listing line outs from an RNG according to the prior art.

Referring to FIG. 6, shown is a table outlining the output lines from a typical random number generator according to the prior art. These output lines include 7 address lines 601, 32 write data lines 602 and 32 read data lines 603 as well as control lines including a clock line 611, a reset line 612, an enable line, 613, a rd line 614, a write line 615, an interrupt request line 616, and an acknowledge line 617. This is significant to the overall layout and resources of a chip in design and manufacture. The control and data lines consume area on, for example, integrated circuits and, as such, TRNGs are often disposed in very close proximity to a circuit relying on the TRNG output value, for example as a seed value.

In addition, in most cases random numbers are used relatively infrequently and are often not required at very high bandwidths or extremely short latencies. In some systems, there is not a controlling processor, or it is not connected directly to the cryptographic subsystem. In these systems it is often desirable to connect the RNG to other logic in the cryptographic system using a more efficient interface. It has now been found that a small interface is more amenable to many hardware system designs.

Use of a small interface reduces the overall space necessary for random value communication. It also allows routing of random values throughout a hardware design with limited additional area or circuitry even when a TRNG is disposed a distance from a circuit portion relying on the TRNG output value. Further, it facilitates the TRNG supplying values to more than one recipient circuit. Because random numbers are generally used infrequently and with a reasonable amount of lead-time, any latency in receiving a value within a sequence of random values is often outweighed by other benefits of the interface design.

Figure 7:
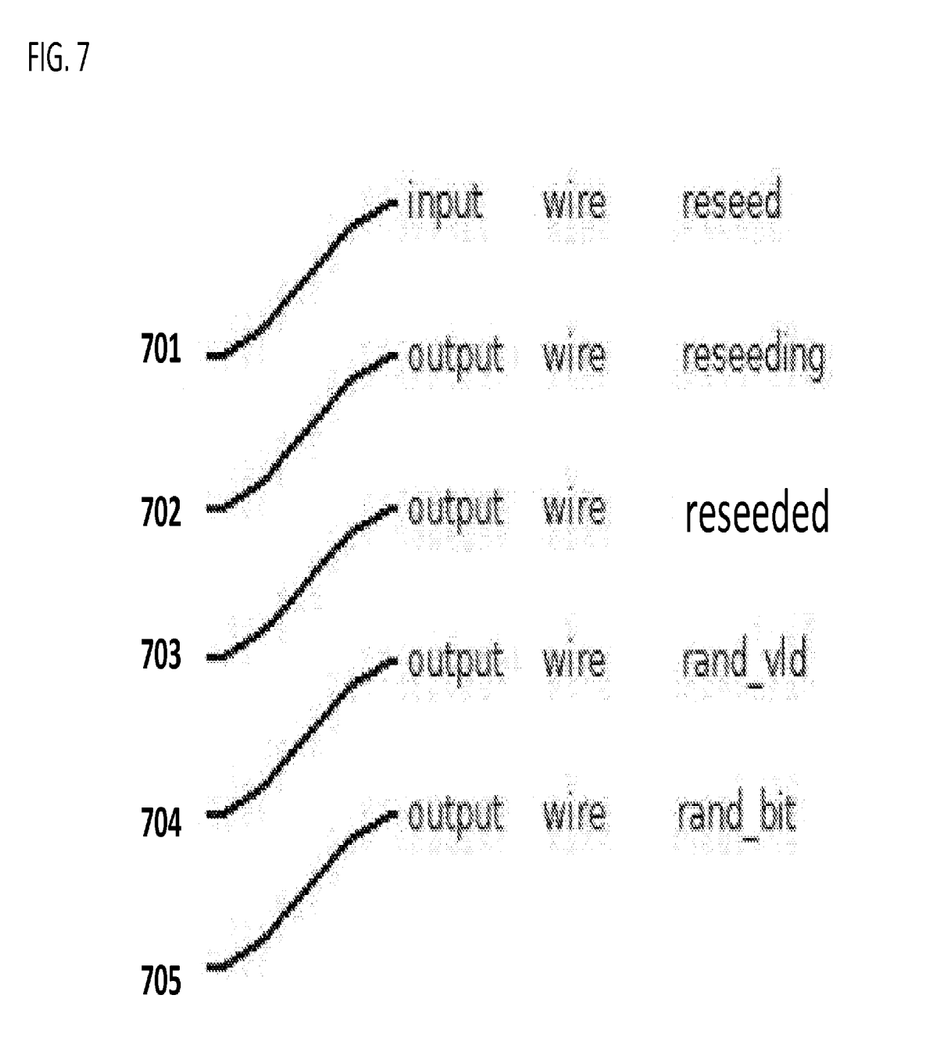
FIG. 7 illustrates a table listing line outs from an RNG according to an embodiment.

Referring to FIG. 7, shown are output lines from an embodiment of a true random number generator. The interface shown comprises the following output lines:
1. a command signal line "reseed" 701 used by a host system, a processor or manager within the integrated circuit to trigger operation of the TRNG;
2. a status signal line "reseeding" 702 used by the TRNG to indicate to a host system, a processor, or manager within the integrated circuit that the TRNG circuit is busy generating new random data values within a random sequence of values;
3. a status signal line "reseeded" 703 used by the TRNG to indicate to a host system, a processor, or manager that the TRNG circuit has available random data consisting of values in a random sequence of values;
4. a data output signal line "rand_bit" 704 for providing the random data to a host system, a processor, or manager; and
5. a status signal line "rand_vld" 705 used by the TRNG to indicate to a host system, a processor, or manager that the TRNG circuit continues to have further random data available.

Optionally, lines 703 and 705 are a same line. Further optionally, the lines described are implemented as ports for having lines conduct signals therefrom or thereto.

An optional sixth signal "reseed_reminder" (not shown) is configurable at build time to provide a RNG output signal to indicate either that an auto-aging reseed operation has been triggered or that reseed is recommended based on one of achieving preset trigger conditions within the RNG module and having provided all of the random data at the data output signal "rand_bit."

The combination of rand_bit and rand_vld forms a serial random data output stream portion of the interface. This design is compatible with a Clock Enabled Shift Register (CESR). Connected modules use the serial random data output stream to shift random data from the TRNG into a "local" register for their own use. For example, the "local" register is a register for use by the circuit requesting the random value. Of course, the serial stream is optionally loaded into other circuits relying on another methodology other than CESR.

Figure 8:
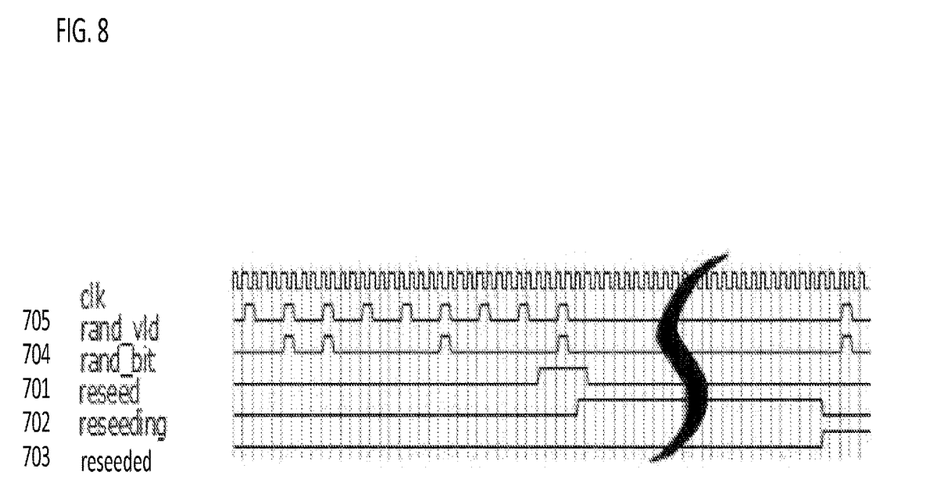
FIG. 8 illustrates a circuit timing diagram of the line outs listed in FIG. 7.

Referring to FIG. 8, shown is a simplified timing diagram for signals on each of the output lines 701 to 705. The timing diagram highlights the signal compatibility with shift register architectures, though other timings are also supportable.

Figure 9:
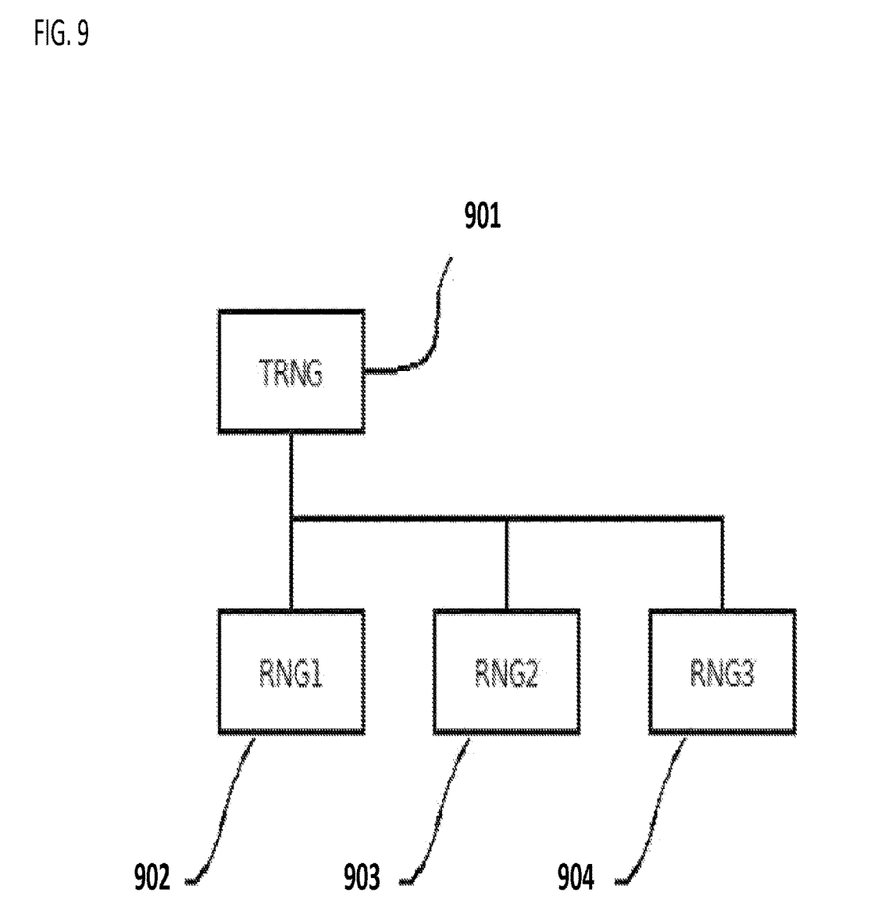
FIG. 9 illustrates a simplified block diagram of a circuit wherein a plurality of circuit functional blocks each draw random values from within a random sequence of values from a same RNG.

Referring to FIG. 9, shown is a simplified block diagram of a circuit having a TRNG 901 as described with reference to FIG. 7. Here, the TRNG 901 is disposed a distance from each of three blocks RNG1 902, RNG2 903, and RNG3 904 each relying on random data from the TRNG 901. Each block draws from the serial stream as needed. Because the output lines are both limited in number and function, the routing of the data to different blocks is simplified as is varied functional requirements in each block. For example, here Block 902 relies on a 2 bit random value for its operation while cipher block 903 relies on a 256 random value as a seed and block 904 relies on a 32 bit random value for its operation. Because the data is retrieved from a serial stream, each block draws a number of bits from the stream as needed and the seed is then regenerated, has the drawn bits replaced, or remains useable to the other blocks as is.

Figure 10:
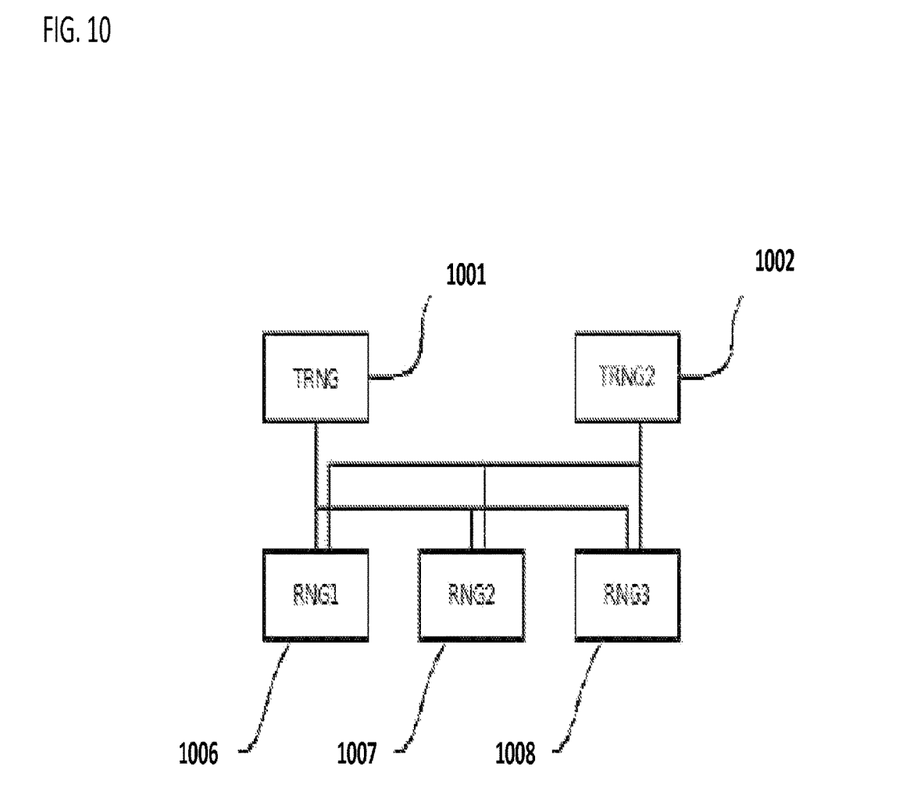
FIG. 10 is a simplified block diagram showing a circuit with multiple TRNGs.

Referring to FIG. 10, shown is a simplified block diagram of a circuit having multiple TRNGs, TRNG 1001 and TRNG 1002, as described with reference to FIG. 2. Here, the TRNGs are disposed a distance from each of three blocks relying on random data RNG1 1006, RNG2 1007, and RNG3 1008. Each block receives a serial stream from each TRNG 1001 and 1002 and draws from a separate serial stream as needed. Because the output lines are both limited in number and function, the routing of the data to the different blocks is simplified as is varied functional requirements in each block. Thus, if either TRNG 1001 or TRNG2 1002 is determined to provide data that has insufficient entropy for proper circuit operation, it can be isolated and the block or blocks relying thereon can instead rely on another TRNG. Sometimes, insufficient entropy for one block is sufficient entropy for another block and, in those circumstances swapping the connections between TRNGs and blocks relying on the TRNG data allows for meeting requirements even when the integrated circuit implementation is flawed. As shown in FIG. 5, each RNG 1006, 1007, and 1008 is coupled for receiving TRNG data from each of two different TRNGs allowing for one of those TRNGs to be isolated or taken off line should a sequence of data therefrom be other than random in nature.

In cases where manufacturing affects reliability of TRNGs, the ability to redirect TRNG output stream(s) after manufacture is sometimes beneficial in "fixing" a circuit such that its operation remains sufficiently functional.

In some applications it is desirable to use both the register random data output stream and the serial random data output stream. For example, in the embodiment of FIG. 10, when one of the blocks 1006, 1007, and 1008 is located outside the integrated circuit, for example coupled to a parallel data bus, supporting register based data retrieval is beneficial. In some embodiments, both the register based interface and the serial interface are accessible simultaneously for retrieving identical information. For many security applications, however, the seed used for a PRNG should never be accessible outside an integrated circuit where the seed is generated and the PRNG resides. In those applications and others, an interlocking blanking system prevents the same random data from being sourced from both the host register interface and the signal ports. The serial output stream is blanked until the internal 128-bit host accessible data register is full. Similarly, when the serial interface is reseeding and contains data from a serial interface initiated reseed operation, the register interface indicates that the RNG is busy and no data output from the register interface is supported. This prevents users in one part of the system from accessing random data present in other parts of the system using the interfaces provided by the RNG. This is a security feature designed to mitigate against certain kinds of attacks. For the stream interface when provided to more than one output port, a similar security feature is implementable. Of course, when all circuits accessing the data are within a same integrated circuit, sometimes the additional security is unnecessary allowing the same data to be read in parallel and serially for separate uses. When the separate use of same random data is not desirable, this is prevented.

The TRNGs each include arbiters to ensure that data provided is provided as requested and to a requesting block. Alternatively, the data is provided in a stream from which each block retrieves data values independent of the TRNG. Further alternatively, the TRNGs remain dedicated with transistors, fuses or other switches selecting which block accesses which TRNG.

Though the lock described prevents reading of data simultaneously, a similar result is achieved by preventing storing of a same data value in each of the stream buffer and the register. Thus, a lock that switches values within the random sequence of values to either the register based interface or the serial interface but never to both would support simultaneous reading of both interfaces while ensuring that data provided therefrom is never based on same values within the random sequence of values. Of course, each may contain identical values as a result of the randomness of the values in each, but this would not be deterministic in nature and, as such, would present little or no information to someone trying to compromise the system.

It is common for access to the serial interface to be arbitrated among several adjacent subsystems. Each of these subsystems has need for, for example, cryptographic quality random numbers at different times in its operation. The arbiter in some embodiments ensures that output from the TRNG is only ever accessible to a single client subsystem at a time. Of course, sometimes systems request random numbers but do not need high quality random numbers. In those situations and where the TRNG generates sufficient output values—bandwidth—the output values from the TRNG are useful for other purposes as well. Further, the interface is also suitable for applications in which the TRNG may supply data through separate interfaces to different subsystems of a larger security system.

Although the above embodiments describe an interface having a set number of data lines, the serial stream of random values is also supportable with varied output lines and varied numbers of output lines. For example, 3 output lines—clock, control, and data—are usable in some systems.

Numerous other embodiments may be envisaged without departing from the scope of the invention.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A system for reseeding a pseudo random number generator to generate pseudo random numbers, the system comprising:
   a seed generator;
   a pseudo random number generator (PRNG) having at least one input register, the PRNG providing a sequence of values in accordance with a deterministic process and based on random seed values generated by the seed generator;
   a serial communication interface between the seed generator and the at least one input register of the PRNG, wherein the serial communication interface comprises:
      a reseed command signal line;
      a reseeding status signal line;
      a rand_bit data output signal line; and
      a rand_vld status signal line; and
   a control/status circuit coupled through the serial communication interface to initiate loading of the at least one input register from the seed generator.

2. The system of claim 1, serial communication interface further comprising a reseeded status signal line.

3. The system of claim 1, serial communication interface further comprising a reseed_reminder signal line.

4. The system of claim 1, wherein the control/status circuit initiates the loading without pausing or stopping the PRNG.

5. The system of claim 1, in which the control/status circuit initiates the loading in response to a pseudo randomly selected condition.

6. The system of claim 5, in which the control/status circuit receives at least one of the provided values and varies the pseudo randomly selected condition based on the received provided value.

7. The system of claim 1, wherein the control/status circuit initiates the loading in response to a manual request.

8. The system of claim 1, further including a second true random number generator generating a second sequence of random values based on noise.

9. The system of claim 8, wherein the control/status circuit determines a known condition based on random values within the second sequence, and periodically varies the known condition.

10. The system of claim 1, the seed generator having an output register and indicating when a value is available in the output register.

11. The system of claim 10, wherein contents of the output register is selectively output through the serial communication interface and through a parallel data bus between the seed generator and the at least one input register of the PRNG.

12. The system of claim 11, wherein the seed generator, PRNG, parallel data bus and the serial communication interface are within a secure integrated circuit and the random seed values are not accessible outside of the secure integrated circuit.

13. The system of claim 10, wherein the control/status circuit initiates the loading in response to the seed generator indicating that a value is available in the output register.

14. The system of claim 1, further comprising an internal host accessible data register, blanking the serial communication interface until the internal host accessible data register is full.

* * * * *